United States Patent
Agrawal et al.

(10) Patent No.: US 12,380,186 B2
(45) Date of Patent: Aug. 5, 2025

(54) UNAUTHORIZED ACTIVITY DETECTION BASED ON INPUT ANALYSIS AND MONITORING

(71) Applicant: Bank of America Corporation, Charlotte, NC (US)

(72) Inventors: Dinesh Kumar Agrawal, McKinney, TX (US); Gilbert M. Gatchalian, Union, NJ (US); Steven Greene, Scarsdale, NY (US); Richard Scot, Huntersville, NC (US); Sanjay Lohar, Charlotte, NC (US); Benjamin F. Tweel, Romeoville, IL (US); James Siekman, Charlotte, NC (US); Erik Dahl, Newark, DE (US); Vijaya L. Vemireddy, Plano, TX (US)

(73) Assignee: Bank of America Corporation, Charlotte, NC (US)

( * ) Notice: Subject to any disclaimer, the term of this patent is extended or adjusted under 35 U.S.C. 154(b) by 136 days.

(21) Appl. No.: 18/214,368

(22) Filed: Jun. 26, 2023

(65) Prior Publication Data
US 2024/0427862 A1    Dec. 26, 2024

(51) Int. Cl.
*G06F 21/31* (2013.01)

(52) U.S. Cl.
CPC .... *G06F 21/316* (2013.01); *G06F 2221/2133* (2013.01)

(58) Field of Classification Search
CPC ........................ G06F 21/316; G06F 2221/2133
(Continued)

(56) References Cited

U.S. PATENT DOCUMENTS

| | | |
|---|---|---|
| 7,139,916 B2 | 11/2006 | Billingsley et al. |
| 7,516,220 B1 | 4/2009 | Stiert |

(Continued)

FOREIGN PATENT DOCUMENTS

| | | | | |
|---|---|---|---|---|
| CN | 112100597 A | * | 12/2020 | |
| KR | 20140070709 A | * | 6/2014 | ............. G06F 21/30 |
| WO | WO-2018190812 A1 | * | 10/2018 | ............. G06F 21/31 |

OTHER PUBLICATIONS

Chen et al., "Step Count Print: A Physical Activity-Based Biometric Identifier for User Identification and Authentication," in IEEE Transactions on Biometrics, Behavior, and Identity Science, vol. 7, No. 2, pp. 210-224, Apr. 2025, doi: 10.1109/TBIOM.*

(Continued)

*Primary Examiner* — Peter C Shaw
(74) *Attorney, Agent, or Firm* — Banner & Witcoff, Ltd.

(57) ABSTRACT

Arrangements for detecting unauthorized activity based on input method analysis and monitoring are provided. In some aspects, identity information associated with a user may be received and be stored. An input may be received from a computing device of the user. An input pattern of the received input may be determined. Using a machine learning model, the input pattern of the received input may be compared to input patterns of humans and input patterns of machines. Based on the comparison, it may be determined whether the user is a human user or a non-human user. Responsive to determining that the user is a non-human user, a request may be transmitted to the user to provide increased authentication credentials. Responsive to determining that the user is a human user, an identity of the user may be verified by comparing the input pattern of the received input to the stored identity information.

18 Claims, 8 Drawing Sheets

(58) Field of Classification Search
USPC .......................................................... 726/19
See application file for complete search history.

(56) References Cited

U.S. PATENT DOCUMENTS

| | | | |
|---|---|---|---|
| 7,562,814 | B1 | 7/2009 | Shao et al. |
| 8,311,876 | B2 | 11/2012 | House |
| 8,321,269 | B2 | 11/2012 | Linden et al. |
| 9,501,630 | B2 | 11/2016 | Paxton et al. |
| 9,898,755 | B2 | 2/2018 | McLaughlin et al. |
| 10,467,394 | B2* | 11/2019 | Asulin .................. G06F 21/316 |
| 10,594,836 | B2 | 3/2020 | Walker et al. |
| 10,839,066 | B1* | 11/2020 | Pham ..................... G06F 21/40 |
| 10,915,923 | B2 | 2/2021 | Kest |
| 11,012,492 | B1 | 5/2021 | Dahan et al. |
| 11,455,382 | B2* | 9/2022 | Embrechts ........... H03K 17/945 |
| 2005/0097320 | A1 | 5/2005 | Golan et al. |
| 2006/0149674 | A1 | 7/2006 | Cook et al. |
| 2008/0281606 | A1 | 11/2008 | Kitts et al. |
| 2010/0145836 | A1 | 6/2010 | Baker et al. |
| 2013/0326604 | A1* | 12/2013 | Hird ........................ G06F 21/36 726/7 |
| 2014/0031009 | A1 | 1/2014 | Vendrow et al. |
| 2015/0205955 | A1 | 7/2015 | Turgeman |
| 2015/0281263 | A1 | 10/2015 | McLaughlin et al. |
| 2015/0379266 | A1 | 12/2015 | McLaughlin et al. |
| 2016/0180068 | A1* | 6/2016 | Das ..................... H04L 63/0861 726/7 |
| 2017/0034148 | A1 | 2/2017 | Rapaport et al. |
| 2017/0116399 | A1* | 4/2017 | Samzelius ............... H04L 63/08 |
| 2017/0193211 | A1* | 7/2017 | Blake ................. H04M 1/72436 |
| 2018/0082052 | A1* | 3/2018 | Swart ...................... G06F 21/32 |
| 2019/0370493 | A1 | 12/2019 | Deutschmann et al. |
| 2022/0277070 | A1* | 9/2022 | Robert Jose ........ H04L 63/0861 |

OTHER PUBLICATIONS

Bhatt et al., "Keystroke dynamics for biometric authenication—A survey," 2013 International Conference on Pattern Recognition, Informatics and Mobile Engineering, Salem, India, 2013, pp. 17-23, doi: 10.1109/ICPRIME.2013.6496441. (Year: 2013).*

Elliot et al., "A Comparison of Machine Learning Algorithms in Keystroke Dynamics," 2019 International Conference on Computational Science and Computational Intelligence (CSCI), Las Vegas, NV, USA, 2019, pp. 127-132, doi: 10.1109/CSCI49370.2019.00028. (Year: 2019)*

Scheffer et al., "Recent developments in voice biometrics: Robustness and high accuracy," 2013 IEEE International Conference on Technologies for Homeland Security (HST), Waltham, MA, USA, 2013, pp. 447-452, doi: 10.1109/THS.2013.6699046. (Year: 2013).*

* cited by examiner

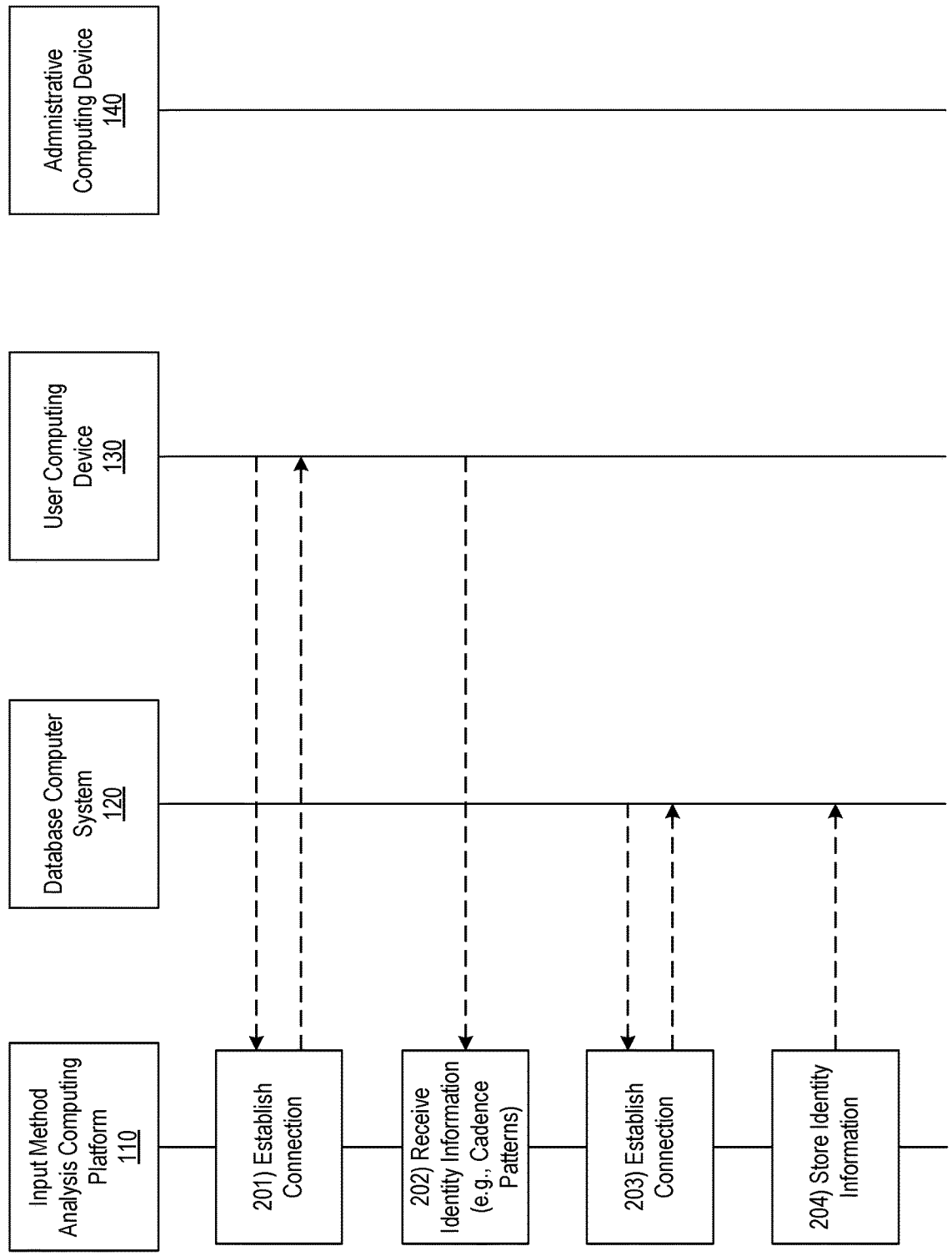

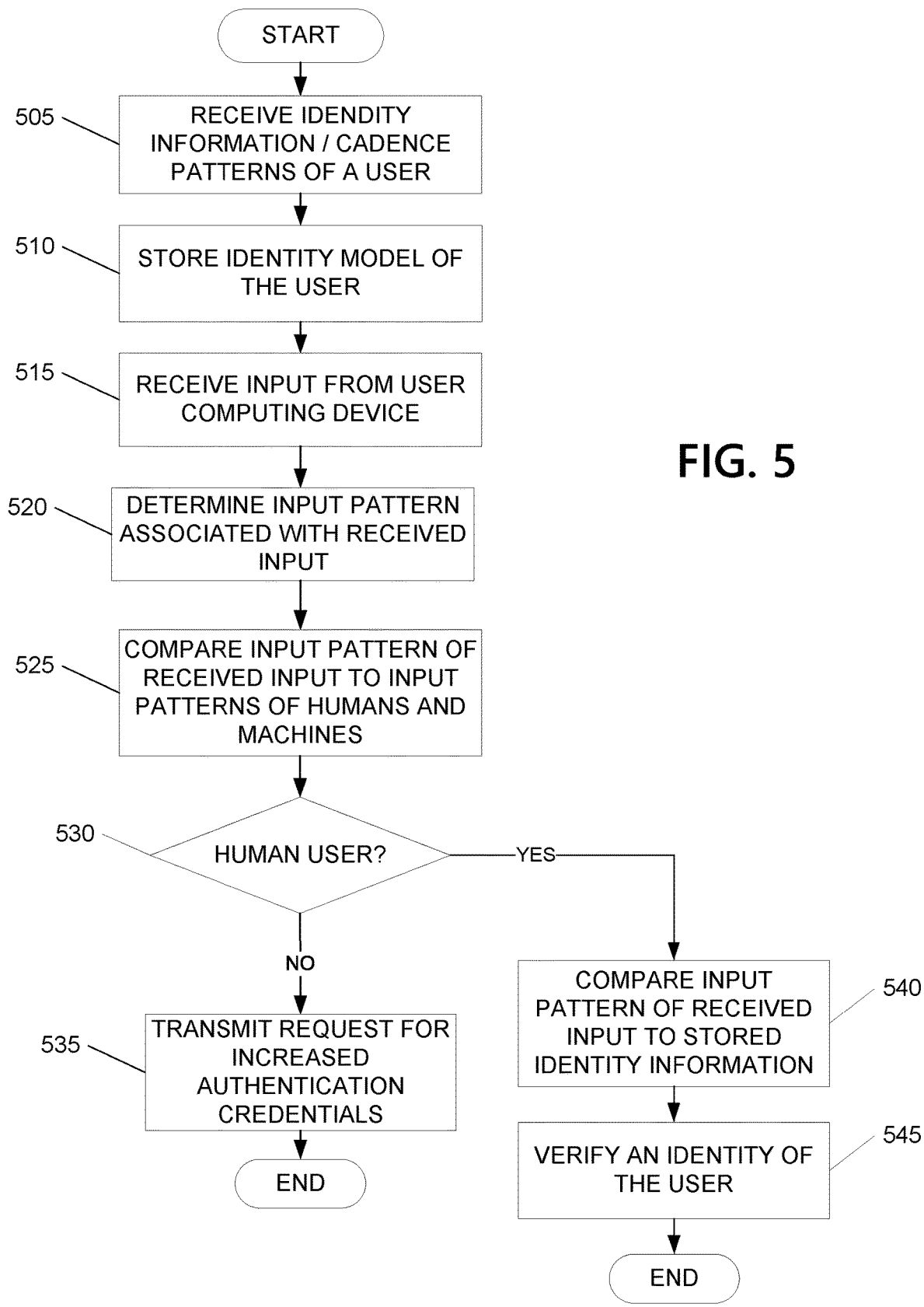

UNAUTHORIZED ACTIVITY DETECTION BASED ON INPUT ANALYSIS AND MONITORING

BACKGROUND

Aspects of the disclosure generally relate to computer systems and networks. In particular, one or more aspects of the disclosure relate to detecting unauthorized activity based on input method analysis and monitoring.

Unauthorized activity is a concern for enterprise organizations, customers, and users. Malicious actors are becoming more sophisticated with automated entry of user information on systems. The differences between bots and trusted users have become increasingly difficult to detect. For instance, it may be difficult to detect when human input is being replaced with automated or computer input. Accordingly, effective ways to detect and prevent unauthorized activity, including synthetic or falsified identification, are needed.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with intelligently detecting unauthorized activity.

In accordance with one or more embodiments, a computing platform having at least one processor, a communication interface, and memory may receive, from a computing device of a user, identity information associated with the user. In addition, the identity information may include cadence patterns associated with the user. The computing platform may store, in a database, an identity model of the user associated with the user based on the received identity information. The computing platform may receive an input from the computing device of the user. The computing platform may determine an input pattern of the received input. In addition, the input pattern of the user may include cadence patterns associated with the received input. The computing platform may compare, using a machine learning model, the input pattern of the received input to one or more input patterns corresponding to a human and one or more input patterns corresponding to a machine. Based on comparing the input pattern of the received input to the one or more input patterns corresponding to the human and the one or more input patterns corresponding to the machine, the computing platform may determine whether the user is a human user or a non-human user. Responsive to determining that the user is a non-human user, the computing platform may transmit, to the computing device of the user, a request to the user to provide increased authentication credentials. In addition, the increased authentication credentials may include authentication credentials different from standard authentication credentials. Responsive to determining that the user is a human user, the computing platform may verify an identity of the user by comparing the input pattern of the received input to the identity information stored in the database.

In some aspects, determining whether the user is a human user or a non-human user may include identifying deviations of the input pattern of the received input from the one or more input patterns corresponding to a human by a predetermined threshold.

In some embodiments, responsive to the input pattern of the received input matching the one or more input patterns corresponding to a human, the computing platform may validate the user as a human user.

In some example arrangements, the computing device of the user may include a telephone.

In some embodiments, determining the input pattern of the received input may include identifying an input speed associated with the received input.

In some arrangements, the cadence patterns may include cadence of voice input, key input, mouse input, handwriting input, or the like.

In some examples, the computing platform may identify background noise portions of the received input, compare the background noise portions of the received input to background noise associated with a human user and background noise associated with a non-human user, and responsive to the comparison, determine whether to request to the user to provide increased authentication credentials.

In some embodiments, determining whether the user is a human user or a non-human user may include performing a callback to the computing device of the user using a pre-registered phone number associated with the user.

In some aspects, transmitting the request to the user to provide increased authentication credentials may include prompting the user to answer a series of increasingly detailed questions to confirm user identity.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2D depict an illustrative event sequence for detecting unauthorized activity based on input method analysis and monitoring in accordance with one or more arrangements discussed herein;

FIG. 5 depicts an illustrative method for detecting unauthorized activity based on input method analysis and monitoring in accordance with one or more arrangements discussed herein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure relate to detecting unauthorized activity in user identification based on input analysis and monitoring. In particular, one or more aspects of the disclosure may identify potential malicious actors by detecting automated input. For example, one or more aspects of the disclosure may detect automated responses or input based on speed of input, mouse movement, speech patterns, cadence, and/or the like. Responsive to detecting automated input, one or more aspects of the disclosure may require heightened authentication. For example, increasingly detailed questions may be asked to confirm user identity or to authenticate a user. Further aspects of the disclosure may detect automated responses or input based on typing patterns, typing speed, whether the input was generated via keystrokes or a copy/paste operation, or the like. Additional aspects of the disclosure may use a pre-registered number to contact the user to confirm identity and/or participation in a telephone call (e.g., voice call) or Internet session. In some examples, detecting a rerouted number (e.g., from a spoofed phone number) may indicate potential unauthorized activity and may trigger heightened authentication or identification measures. Further aspects of the disclosure may use machine learning to evaluate speech patterns. Additionally or alternatively, aspects of the disclosure may identify pauses between keystrokes (e.g., depression of keys on a keyboard) to distinguish between human users and non-human users (e.g., automated or computer processes). For instance, human users tend to behave more imperfectly or erratically (e.g., have varied times between keystrokes), whereas automated systems tend to be more mechanical in nature (e.g., have the same pause between keystrokes). These and various other arrangements will be discussed more fully below.

Figure 1A:
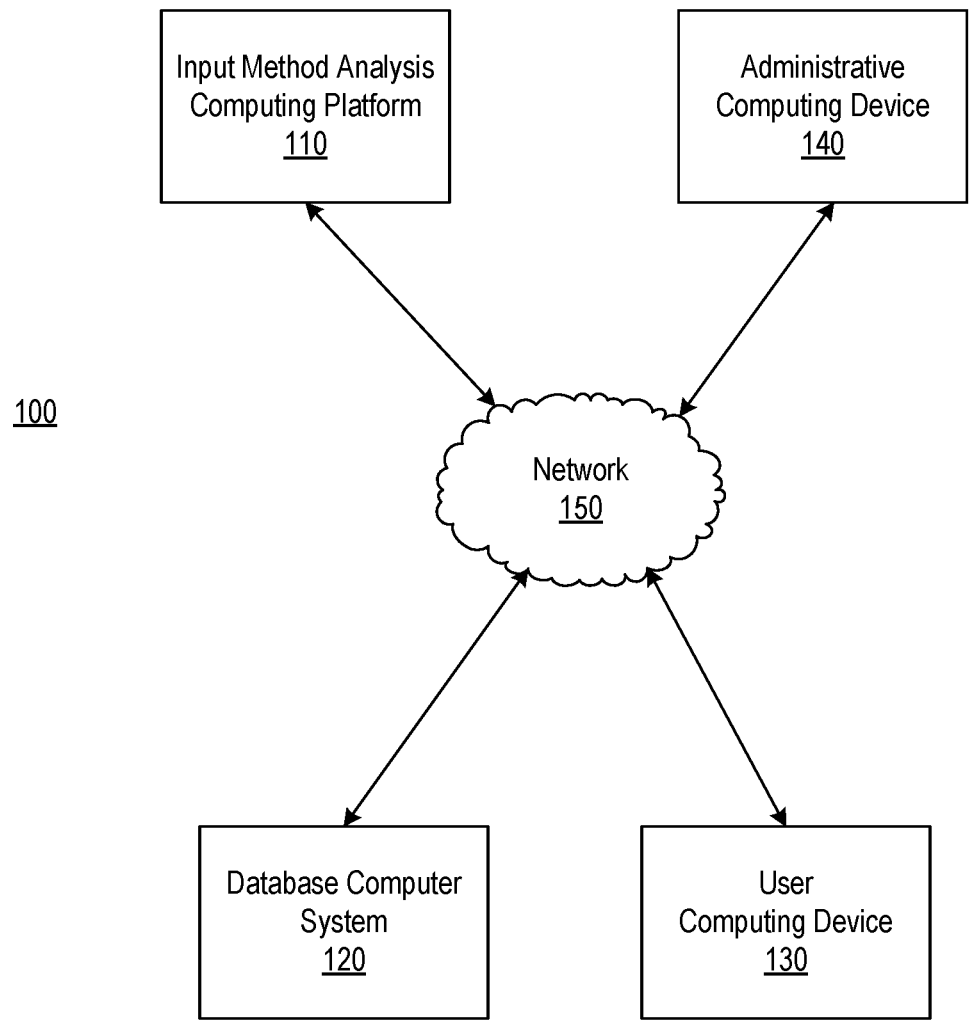
FIGS. 1A and 1B depict an illustrative computing environment for detecting unauthorized activity based on input method analysis and monitoring in accordance with one or more arrangements discussed herein.
Figure 1B:
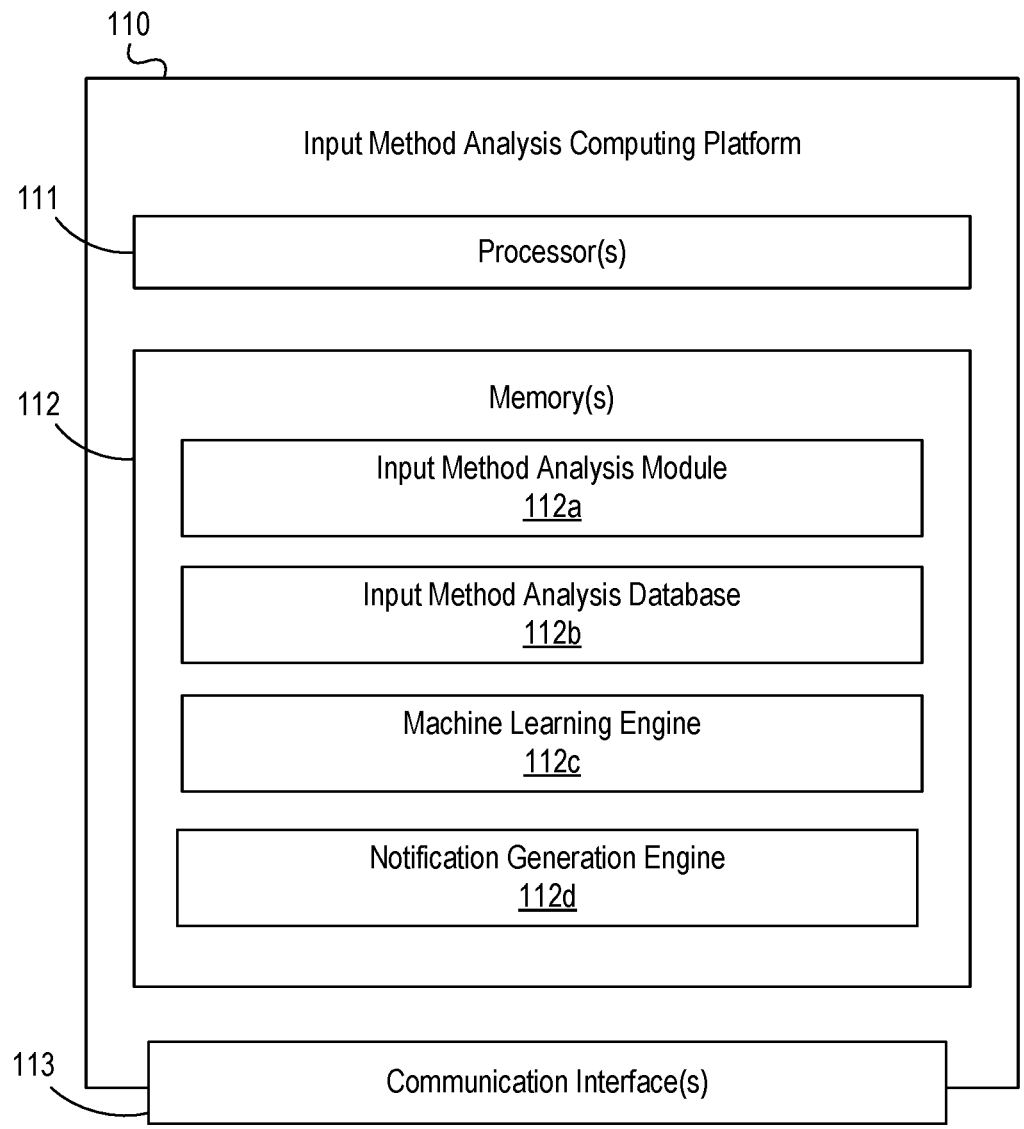

Aspects described herein may be implemented using one or more computing devices operating in a computing environment. For instance, FIGS. 1A and 1B depict an illustrative computing environment for detecting unauthorized activity based on input method analysis and monitoring in accordance with one or more example arrangements. Referring to FIG. 1A. computing environment 100 may include one or more computing devices and/or other computing systems. For example, computing environment 100 may include input method analysis computing platform 110, database computer system 120, user computing device 130, and administrative computing device 140. In some examples, computing environment 100 may be a distributed computing environment such as a cloud computing environment. Although one database computer system 120, one user computing device 130, and one administrative computing device 140 are shown, any number of devices or data sources may be used without departing from the disclosure.

As described further below, input method analysis computing platform 110 may include one or more computing devices configured to perform one or more of the functions described herein. For example, input method analysis computing platform 110 may include one or more computer systems, servers, server blades, or the like. In one or more instances, input method analysis computing platform 110 may be configured to host and/or otherwise maintain one or more machine learning models that may be used in performing input method analysis and monitoring and/or one or more other functions described herein. Among other functions, input method analysis computing platform 110 may monitor data input or voice characteristics to detect potential unauthorized activity associated with automated responses. In some instances, input method analysis computing platform 110 may be configured to dynamically tune machine learning models and/or algorithms as additional data is received, detected, or analyzed.

Database computer system 120 may include different information storage entities storing identity information associated with the user. In addition, the identity information may include cadence patterns associated with the user (e.g., cadence of voice input, key input, mouse input, handwriting input, or the like). In some examples, database computer system 120 may store one or more user identity models for identifying an identity of a user (e.g., user identity models associated with speech or typing patterns of a user). Additionally or alternatively, the one or more user identity models may evolve or change with time (e.g., as a user's voice or typing style changes). In some examples, database computer system 120 may store pre-registered information associated with the user (e.g., pre-registered phone numbers).

User computing device 130 may be or include one or more computing devices and/or other computer components (e.g., processors, memories, communication interfaces). For example, user computing device 130 may be a desktop computing device (e.g., desktop computer, terminal), or the like or a mobile computing device (e.g., telephone, smartphone, tablet, smart watch, laptop computer, or the like) used by users interacting with input method analysis computing platform 110.

Administrative computing device 140 may be or include one or more computing devices and/or other computer components (e.g., processors, memories, communication interfaces). For instance, administrative computing device 140 may be a server, desktop computer, laptop computer, tablet, mobile device, or the like, and may be used by an information security officer, administrative user, or the like. In addition, administrative computing device 140 may be associated with an enterprise organization operating input method analysis computing platform 110. In some examples, administrative computing device 140 may be used to configure, control, and/or otherwise interact with input method analysis computing platform 110, and/or one or more other devices and/or systems included in computing environment 100.

Computing environment 100 also may include one or more networks, which may interconnect one or more of input method analysis computing platform 110, database computer system 120, user computing device 130, and administrative computing device 140. For example, computing environment 100 may include a network 150 (which may, e.g., interconnect input method analysis computing platform 110, database computer system 120, user computing device 130, administrative computing device 140, and/or one or more other systems which may be associated with an enterprise organization, such as a financial institution, with one or more other systems, public networks, sub-networks, and/or the like).

In one or more arrangements, input method analysis computing platform 110. database computer system 120, user computing device 130, and administrative computing device 140 may be any type of computing device capable of identifying potential unauthorized activity involving automated responses or input. For example, input method analysis computing platform 110, database computer system 120, user computing device 130, administrative computing device 140, and/or the other systems included in computing environment 100 may, in some instances, include one or more processors, memories, communication interfaces, storage devices, and/or other components. As noted above, and as illustrated in greater detail below, any and/or all of the computing devices included in computing environment 100 may, in some instances, be special-purpose computing devices configured to perform specific functions as described herein.

Referring to FIG. 1B, input method analysis computing platform 110 may include one or more processors 111, memory 112, and communication interface 113. A data bus may interconnect processor(s) 111, memory 112, and communication interface 113. Communication interface 113 may be a network interface configured to support communication between input method analysis computing platform 110 and one or more networks (e.g., network 150, or the like). Memory 112 may include one or more program modules having instructions that when executed by processor(s) 111 cause input method analysis computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of input method analysis computing platform 110 and/or by different computing devices that may form and/or otherwise make up input method analysis computing platform 110.

For example, memory 112 may have, store and/or include an input method analysis module 112a, an input method analysis database 112b, a machine learning engine 112c, and a notification generation engine 112d. Input method analysis module 112a, may have instructions that direct and/or cause input method analysis computing platform 110 to, for instance, learn to identify the presence of potential unauthorized activity associated with automated input and determine when to trigger heightened authentication, and/or instructions that direct input method analysis computing platform 110 to perform other functions, as discussed in greater detail below. Input method analysis database 112b may store information used by input method analysis module 112a and/or input method analysis computing platform 110 in performing input method analysis and monitoring, and/or in performing other functions, as discussed in greater detail below.

Input method analysis computing platform 110 may further have, store and/or include a machine learning engine 112c. Machine learning engine 112c may use artificial intelligence/machine learning (AI/ML) algorithms to derive rules and identify patterns and anomalies associated with received data/input. In some examples, the AI/ML algorithm may include natural language processing (NLP), abstract syntax trees (ASTs), clustering, and/or the like. Machine learning engine 112c may have instructions that direct and/or cause input method analysis computing platform 110 to set, define, and/or iteratively redefine rules, techniques and/or other parameters used by input method analysis computing platform 110 and/or other systems in computing environment 100 in identifying the presence of potential unauthorized activity associated with automated input and triggering heightened authentication requirements when appropriate. In some examples, input method analysis computing platform 110 may build and/or train one or more machine learning models. For example, memory 112 may have, store, and/or include historical/training data. In some examples, input method analysis computing platform 110 may receive historical and/or training data and use that data to train one or more machine learning models stored in machine learning engine 112c. The historical and/or training data may include, for instance, historical data input characteristics (e.g., input speed data, data on pauses between keystrokes), historical pattern data (e.g., speech or typing patterns, cadence patterns), and/or the like. The data may be gathered and used to build and train one or more machine learning models executed by machine learning engine 112c to identify one or more potential unauthorized activity involving automated input, including determining whether the user/data should be flagged for investigation (e.g., for potential anomalous or unauthorized activity), and/or perform other functions, as discussed in greater detail below. Various machine learning algorithms may be used without departing from the disclosure, such as supervised learning algorithms, unsupervised learning algorithms, abstract syntax tree algorithms, natural language processing algorithms, clustering algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, artificial neural network algorithms, and the like. Additional or alternative machine learning algorithms may be used without departing from the disclosure.

Input method analysis computing platform 110 may further have, store and/or include a notification generation engine 112d. Notification generation engine 112d may store instructions and/or data that may cause or enable input method analysis computing platform 110 to send, to another computing device (e.g., administrative computing device 140), notifications or results related to detection of potential anomalous or unauthorized activity.

FIGS. 2A-2D depict one example illustrative event sequence for detecting unauthorized activity based on input method analysis and monitoring in accordance with one or more aspects described herein. The events shown in the illustrative event sequence are merely one example sequence and additional events may be added, or events may be omitted, without departing from the disclosure. Further, one or more processes discussed with respect to FIGS. 2A-2D may be performed in real-time or near real-time.

With reference to FIG. 2A, at step 201, input method analysis computing platform 110 may connect to user computing device 130. For instance, a first wireless connection may be established between input method analysis computing platform 110 and user computing device 130. Upon establishing the first wireless connection, a communication session may be initiated between input method analysis computing platform 110 and user computing device 130.

At step 202, input method analysis computing platform 110 may receive, via a communication interface (e.g., communication interface 113), from a computing device of a user (e.g., user computing device 130), identity information associated with the user. In addition, the identity information may include cadence patterns associated with the user. In some examples. the cadence patterns may include cadence of voice input, key input (e.g., keystrokes), mouse input, handwriting input, or the like. For instance, a voice cadence may include a way that a user's voice gets higher or lower as they speak, a rhythmic flow in their speaking (e.g., pauses between words), or the like. For instance, a typing cadence may include how long a user holds down various keys (e.g., uniformity in entering keystrokes), how long it takes to move between keys (e.g., pauses between keystrokes), or the like.

At step 203, database computer system 120 may connect to input method analysis computing platform 110. For instance, a second wireless connection may be established between database computer system 120 and input method analysis computing platform 110. Upon establishing the second wireless connection, a communication session may be initiated between database computer system 120 and input method analysis computing platform 110.

At step 204, input method analysis computing platform 110 may store, in a database (e.g., database computer system), an identity model of the user associated with the user based on the received identity information (e.g., user identity models that identify speech patterns, typing patterns, or speech mannerisms of a user). Additionally or alternatively, the identity model may evolve or change with time (e.g., as a user's voice or typing style changes with time). In some examples, input method analysis computing platform 110 may store, in the database (e.g., database computer system 120), pre-registered information (e.g., pre-registered phone numbers) which may be subsequently used to confirm user identity.

Figure 2B:
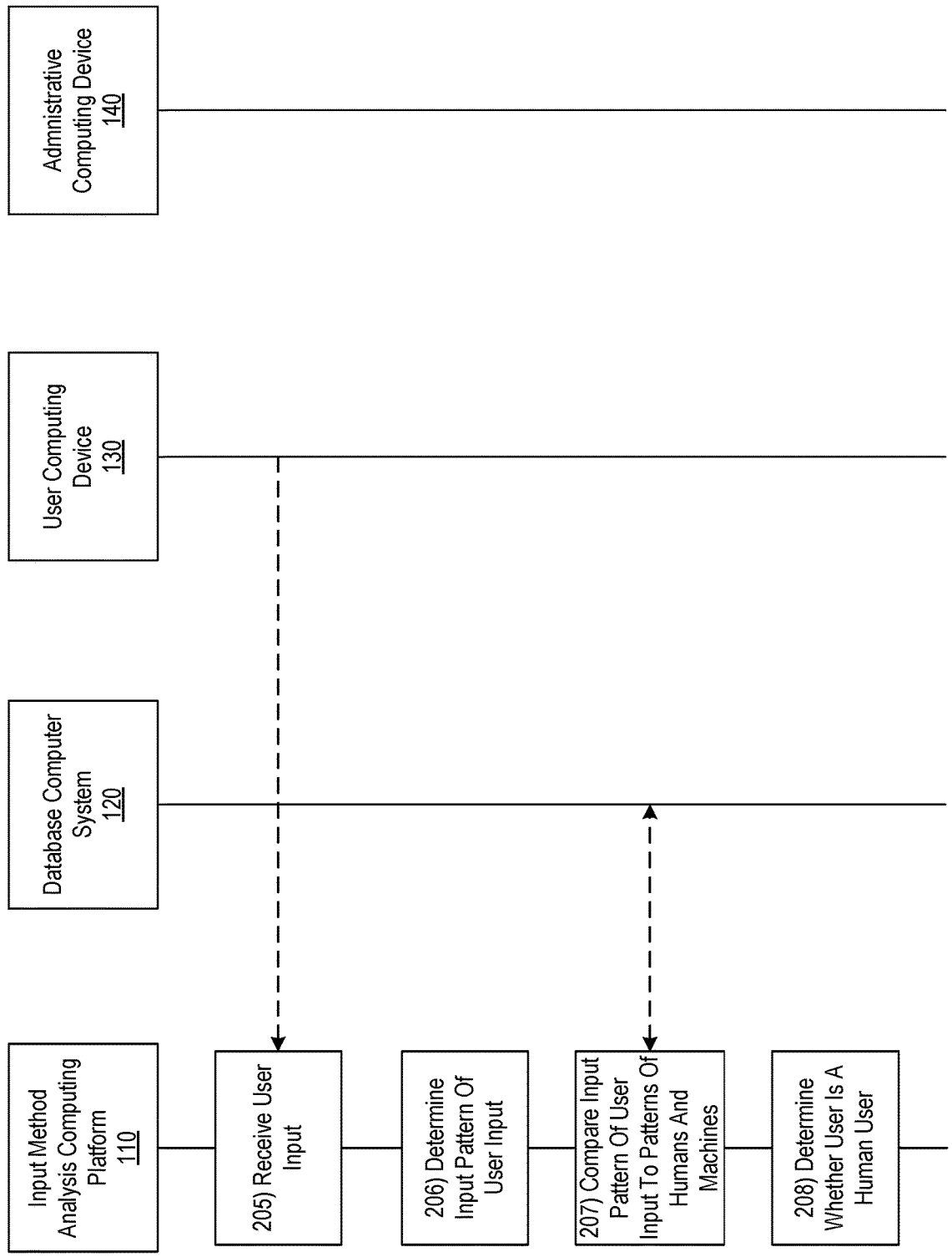

Referring to FIG. 2B, at step 205, input method analysis computing platform 110 may receive an input from the computing device of the user (e.g., user computing device 130). In some examples, the received input may be and/or include a keyboard input, mouse input, voice input, touchpad input, pen or stylus input, or the like. At step 206, input method analysis computing platform 110 may determine an input pattern of the received input. In addition, the input pattern of the user may include cadence patterns associated with the received input. In some examples, the cadence patterns may include cadence of voice input, key input (e.g., keystrokes), mouse input, handwriting input, or the like. In some examples, input method analysis computing platform 110 may identify an input speed associated with the received input (e.g., speaking speed, typing speed, mouse click speed, etc.).

At step 207, input method analysis computing platform 110 may compare, using a machine learning model (e.g., machine learning engine 112c), the input pattern of the received input to one or more known input patterns corresponding to a human and one or more known input patterns corresponding to a computer or machine. In some examples, input patterns corresponding to a human may include varied times between keystrokes or pauses that occur before or after an input (e.g., a delay before a person realizes they got through on a call and starts to talk). In some examples, input patterns corresponding to a computer or machine may include uniformity in entering keystrokes (e.g., numbers are entered equidistance time apart from each other), multiple pastes in a short period of time, or inputting field text by script.

At step 208, based on the comparison (e.g., at step 207), input method analysis computing platform 110 may determine whether the user is a human user (e.g., a real or valid person) or a non-human user (e.g., an automated process/computer or a bot). In some examples, input method analysis computing platform 110 may identify deviations of the input pattern of the received input from the one or more known input patterns corresponding to a human. For example, responsive to the input pattern of the received input matching the one or more input patterns (e.g., above/greater than or equal to a predetermined threshold percentage of matching) corresponding to a human, input method analysis computing platform 110 may validate the user as a human user. In some examples, responsive to the input pattern of the received input failing to match any of the one or more input patterns corresponding to a human, or when a percentage of match is below/less than the predetermined threshold, input method analysis computing platform 110 may deny authentication to the user. In some examples, the predetermined threshold may be set by an administrative user (e.g., of administrative computing device 140), as a default or adjustable variable.

Additionally or alternatively, in some examples, input method analysis computing platform 110 may identify background noise portions of the received input, compare the background noise portions of the received input to background noise associated with a human user and background noise associated with a non-human user, and responsive to the comparison, determine whether to request to the user to provide increased authentication (e.g., heightened authentication) credentials. For instance, background noise from a digitally generated conversation involving a bot may include mechanical or digital noise that is consistent throughout a call, whereas background noise from a conversation involving real persons may include breathing sounds, sounds of other speakers, or everyday sounds (e.g., dogs barking, lawn mower sounds, television sounds).

Additionally or alternatively, in some examples, input method analysis computing platform 110 may perform a callback to the computing device of the user (e.g., user computing device 130) using a pre-registered phone number associated with the user to confirm identity and/or participation in a telephone call (e.g., voice call) or Internet session.

Figure 2C:
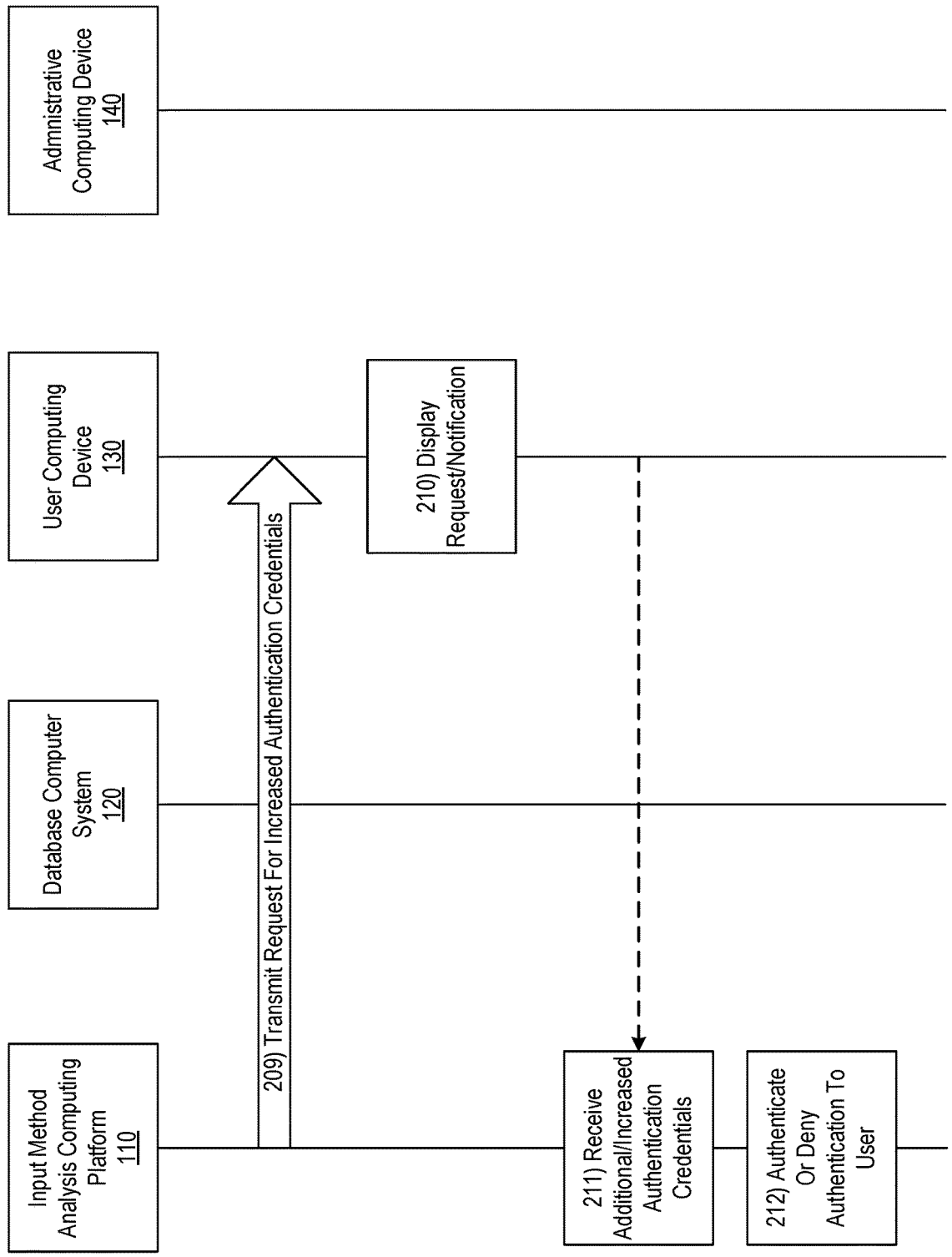
Figure 3:
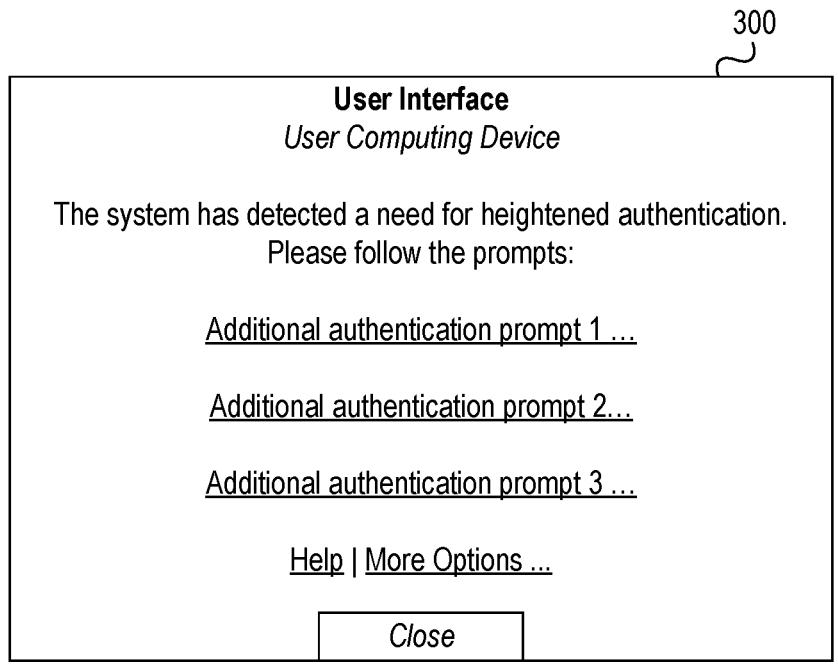
FIGS. 3 and 4 depict example graphical user interfaces for detecting unauthorized activity based on input method analysis and monitoring in accordance with one or more arrangements discussed herein.

Referring to FIG. 2C, at step 209, input method analysis computing platform 110 may, responsive to determining that the user is a non-human user, transmit, via the communication interface (e.g., communication interface 113), to the computing device of the user (e.g., user computing device 130), a request to the user to provide increased authentication credentials (e.g., heightened/additional authentication credentials, different from standard authentication credentials). In addition, the increased authentication credentials may include a level of authentication beyond standard authentication. In some aspects, transmitting the request to the user to provide increased authentication credentials may include prompting the user to answer a series of increasingly detailed questions to confirm user identity. For example, the computing device of the user (e.g., user computing device 130) may display and/or otherwise present one or more graphical user interfaces similar to graphical user interface 300, which is illustrated in FIG. 3. As shown in FIG. 3, graphical user interface 300 may include text and/or other information associated with increased or heightened authentication requirements (e.g., "The system has detected a need for heighted authentication. Please follow the prompts: [Additional authentication prompt 1 . . . ] [Additional authentication prompt 2 . . . ] [Additional authentication prompt 3 . . . ]"). Returning to FIG. 2C, at step 210, the computing device of the user (e.g., user computing device 130) may receive and display the graphical representation. It will be appreciated that other and/or different notifications may also be provided. In turn, at step 211, input method analysis computing platform 110 may receive the increased authentication credentials (e.g., heightened/additional authentication credentials) from the computing device of the user (e.g., user computing device 130).

At step 212, based on determining that the user is a non-human user, input method analysis computing platform 110 may authenticate, or deny authentication to, the user based on the received increased authentication credentials (e.g., heightened/additional authentication credentials) from the computing device of the user (e.g., user computing device 130).

Figure 2D:
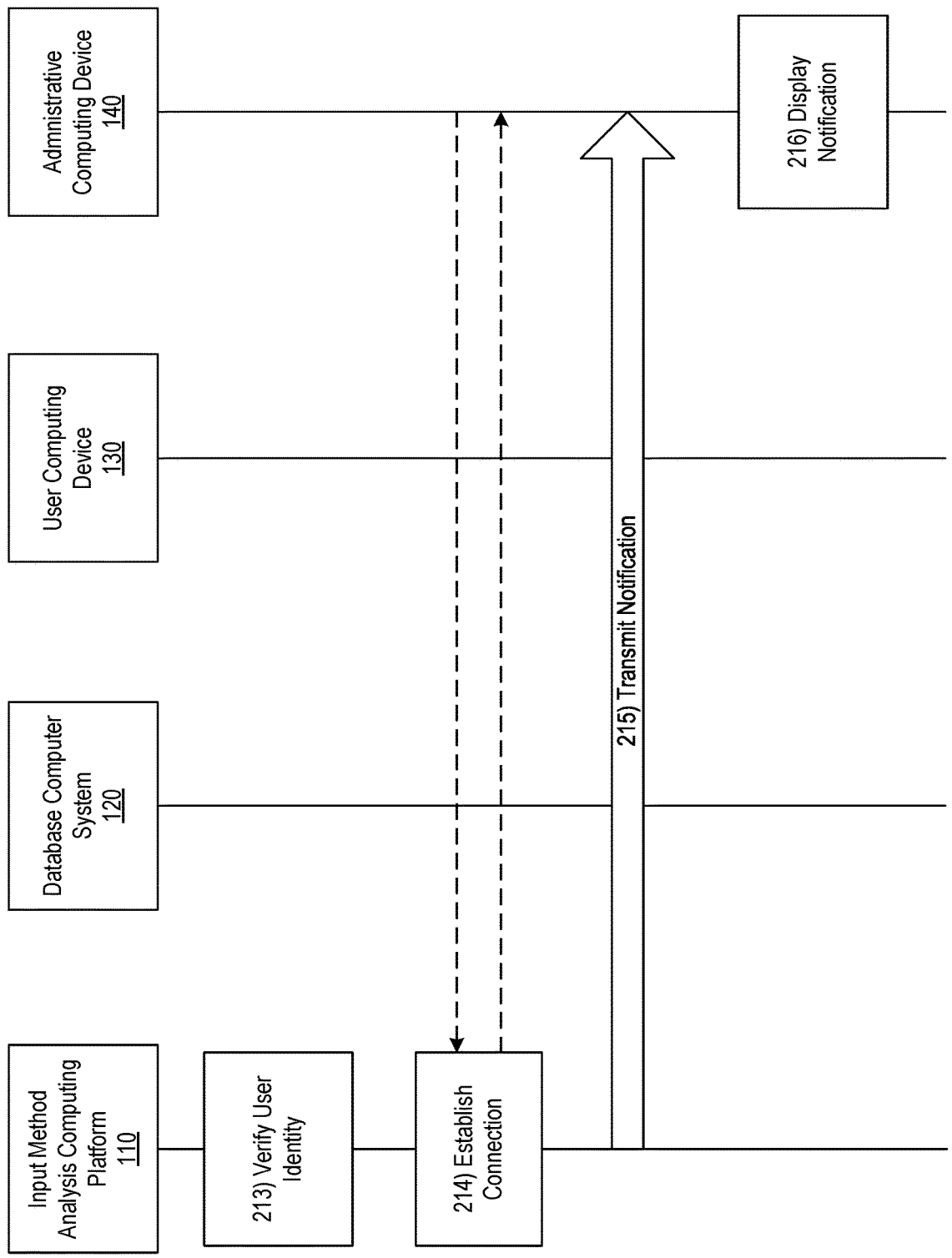

Referring to FIG. 2D, at step 213, responsive to determining that the user is a human user, input method analysis computing platform 110 may authenticate, or deny authentication to, the user and/or verify an identity of the user (e.g., the user is actually who they say they are) by comparing the input pattern of the received input to the identity information stored in the database (e.g., comparing the receive input to previous input patterns of the user).

At step 214, input method analysis computing platform 110 may connect to administrative computing device 140. For instance, a third wireless connection may be established between input method analysis computing platform 110 and administrative computing device 140. Upon establishing the third wireless connection, a communication session may be initiated between input method analysis computing platform 110 and administrative computing device 140.

Figure 4:
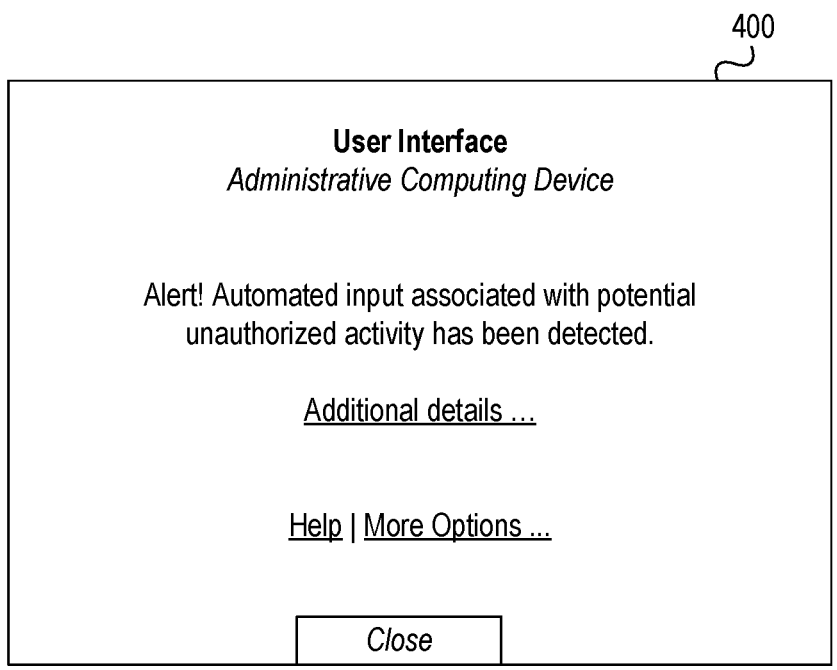

At step 215, input method analysis computing platform 110 may transmit (e.g., via notification generation engine 112d), via the communication interface (e.g., communication interface 113), one or more notifications or alerts (e.g., to administrative computing device 140). For instance, the administrative computing device (e.g., administrative computing device 140) may display and/or otherwise present one or more graphical user interfaces similar to graphical user interface 400, which is illustrated in FIG. 4. As shown in FIG. 4, graphical user interface 400 may include text and/or other information associated with an alert or notification (e.g., "Alert! Automated input associated with potential unauthorized activity has been detected. [Additional details . . . ]"). It will be appreciated that other and/or different notifications may also be provided. Returning to FIG. 2D, at step 216, the administrative computing device (e.g., administrative computing device 140) may receive and display the notification or alert (e.g., security notification). It will be appreciated that other and/or different notifications may also be provided.

FIG. 5 depicts an illustrative method for detecting unauthorized activity based on input method analysis and monitoring in accordance with one or more example embodiments. With reference to FIG. 5, at step 505, a computing platform having at least one processor, a communication interface, and memory may receive, from a computing device of a user, identity information associated with the user. In addition, the identity information may include cadence patterns associated with the user. At step 510, the computing platform may store the identity information associated with the user in a database. At step 515, the computing platform may receive an input from the computing device of the user. At step 520, the computing platform may determine an input pattern of the received input. In addition, the input pattern of the user may include cadence patterns associated with the received input. At step 525, the computing platform may compare, using a machine learning model, the input pattern of the received input to one or more input patterns corresponding to a human and one or more input patterns corresponding to a machine. At step 530, based on comparing the input pattern of the received input to the one or more input patterns corresponding to the human and the one or more input patterns corresponding to the machine, the computing platform may determine whether the user is a human user or a non-human user. At step 535, responsive to determining that the user is a non-human user (e.g., 530: NO), the computing platform may transmit, to the computing device of the user, a request to the user to provide increased authentication credentials, different from standard authentication credentials. At step 540, responsive to determining that the user is a human user (e.g., 530: YES), the computing platform may compare the input pattern of the received input to the identity information stored in the database. At step 545, the computing platform may verify an identity of the user.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
  one or more processors;
  a communication interface communicatively coupled to the one or more processors; and
  memory storing computer-readable instructions that, when executed by the one or more processors, cause the computing platform to:
    receive, via the communication interface, from a computing device of a user, identity information associated with the user, wherein the identity information includes cadence patterns associated with the user;
    store, in a database, the identity information associated with the user;
    receive, via the communication interface, an input from the computing device of the user;
    determine an input pattern of the received input, wherein the input pattern of the user includes cadence patterns associated with the received input;
    compare, using a machine learning model, the input pattern of the received input to one or more input patterns corresponding to a human and one or more input patterns corresponding to a machine;
    further compare a background noise portion of the received input to background noise associated with a human user and a non-human user stored in the database;
    based on these comparisons, determine whether the user is a human user or a non-human user;
    responsive to determining that the user is a non-human user, transmit, to the computing device of the user, a request to the user to provide increased authentication credentials, wherein the increased authentication credentials include authentication credentials different from standard authentication credentials; and
    responsive to determining that the user is a human user, verify an identity of the user by comparing the input pattern of the received input to the identity information stored in the database.

2. The computing platform of claim 1, wherein determining whether the user is a human user or a non-human user includes identifying deviations of the input pattern of the received input from the one or more input patterns corresponding to a human by a predetermined threshold.

3. The computing platform of claim 1, responsive to the input pattern of the received input matching the one or more input patterns corresponding to a human, validating the user as a human user.

4. The computing platform of claim 1, wherein the computing device of the user includes a telephone.

5. The computing platform of claim 1, wherein determining the input pattern of the received input includes identifying an input speed associated with the received input.

6. The computing platform of claim 1, wherein the cadence patterns include cadence of one or more of: voice input, key input, mouse input, or handwriting input.

7. The computing platform of claim 1, wherein determining whether the user is a human user or a non-human user includes performing a callback to the computing device of the user using a pre-registered phone number associated with the user.

8. The computing platform of claim 1, wherein transmitting the request to the user to provide increased authentication credentials includes prompting the user to answer a series of increasingly detailed questions to confirm user identity.

9. A method, comprising:
  at a computing platform comprising at least one processor, a communication interface, and memory:
    receiving, by the at least one processor, via the communication interface, from a computing device of a user, identity information associated with the user, wherein the identity information includes cadence patterns associated with the user;
    storing, by the at least one processor, in a database, the identity information associated with the user; receiving, by the at least one processor, via the communication interface, an input from the computing device of the user;
    determining, by the at least one processor, an input pattern of the received input, wherein the input pattern of the user includes cadence patterns associated with the received input;
    comparing, by the at least one processor, using a machine learning model, the input pattern of the received input to one or more input patterns corresponding to a human and one or more input patterns corresponding to a machine;
    further comparing a background noise portion of the received input to background noise associated with a human user and a non-human user stored in the database;
    based on these comparisons, determining, by the at least one processor, whether the user is a human user or a non-human user;
    responsive to determining that the user is a non-human user, transmitting, by the at least one processor, to the computing device of the user, a request to the user to provide increased authentication credentials, wherein the increased authentication credentials include authentication credentials different from standard authentication credentials; and
    responsive to determining that the user is a human user, verifying, by the at least one processor, an identity of the user by comparing the input pattern of the received input to the identity information stored in the database.

10. The method of claim 9, wherein determining whether the user is a human user or a non-human user includes identifying, by the at least one processor, deviations of the input pattern of the received input from the one or more input patterns corresponding to a human by a predetermined threshold.

11. The method of claim 9, further comprising: responsive to the input pattern of the received input matching the one or more input patterns corresponding to a human, validating, by the at least one processor, the user as a human user.

12. The method of claim 9, wherein the computing device of the user includes a telephone.

13. The method of claim 9, wherein determining the input pattern of the received input includes identifying, by the at least one processor, an input speed associated with the received input.

14. The method of claim 9, wherein the cadence patterns include cadence of one or more of: voice input, key input, mouse input, or handwriting input.

15. The method of claim 9, wherein determining whether the user is a human user or a non-human user includes performing, by the at least one processor, a callback to the computing device of the user using a pre-registered phone number associated with the user.

16. The method of claim 9, wherein transmitting the request to the user to provide increased authentication credentials includes prompting, by the at least one processor, the user to answer a series of increasingly detailed questions to confirm user identity.

17. One or more non-transitory computer-readable media storing instructions that, when executed by a computing platform comprising at least one processor, memory, and a communication interface, cause the computing platform to:
   receive, via the communication interface, from a computing device of a user, identity information associated with the user, wherein the identity information includes cadence patterns associated with the user;
   store, in a database, the identity information associated with the user;
   receive, via the communication interface, an input from the computing device of the user;
   determine an input pattern of the received input, wherein the input pattern of the user includes cadence patterns associated with the received input;
   compare, using a machine learning model, the input pattern of the received input to one or more input patterns corresponding to a human and one or more input patterns corresponding to a machine;
   further compare a background noise portion of the received input to background noise associated with a human user and a non-human user stored in the database;
   based on these comparisons, determine whether the user is a human user or a non-human user;
   responsive to determining that the user is a non-human user, transmit, to the computing device of the user, a request to the user to provide increased authentication credentials, wherein the increased authentication credentials include authentication credentials different from standard authentication credentials; and
   responsive to determining that the user is a human user, verify an identity of the user by comparing the input pattern of the received input to the identity information stored in the database.

18. The one or more non-transitory computer-readable media of claim 17, wherein the cadence patterns include cadence of one or more of: voice input, key input, mouse input, or handwriting input.

* * * * *